Sept. 5, 1933. W. O. TWOMBLY 1,925,352
TEMPERATURE CONTROL SYSTEM FOR AUTOMOTIVE ENGINES
Filed June 24, 1932 3 Sheets-Sheet 1
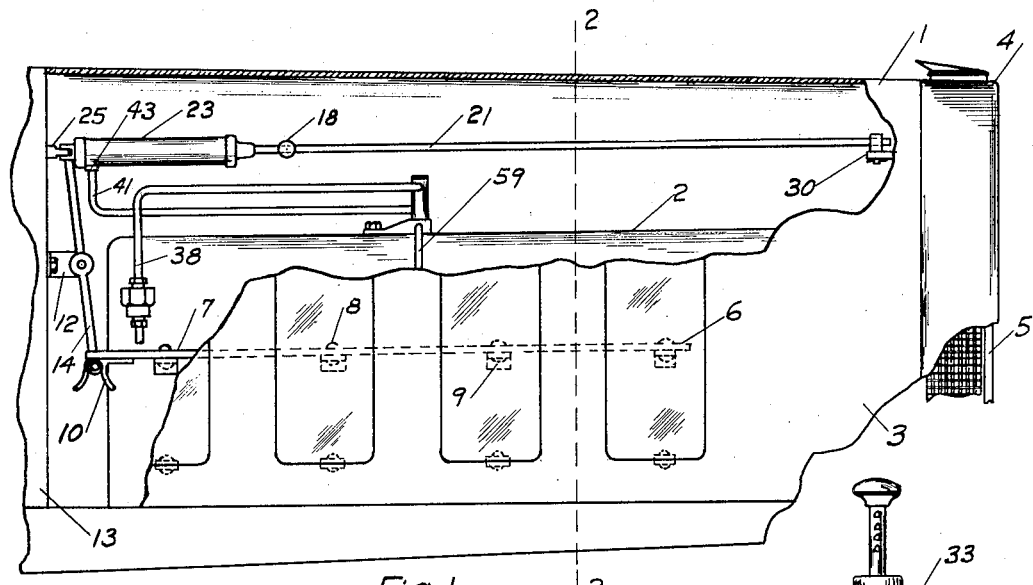
Fig. 1
Fig. 2
Fig. 3
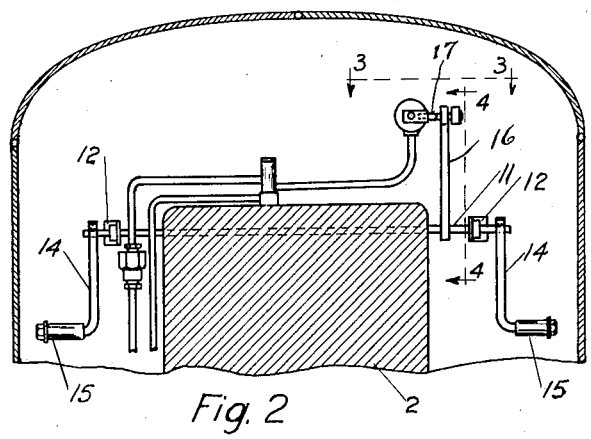
Fig. 4
Inventor
Willard O. Twombly
by
Attorney Sept. 5, 1933.   W. O. TWOMBLY   1,925,352
TEMPERATURE CONTROL SYSTEM FOR AUTOMOTIVE ENGINES
Filed June 24, 1932   3 Sheets-Sheet 2

Inventor
Willard O. Twombly
by Townsend & Beaman
Attorney

Sept. 5, 1933.     W. O. TWOMBLY     1,925,352

TEMPERATURE CONTROL SYSTEM FOR AUTOMOTIVE ENGINES

Filed June 24, 1932     3 Sheets-Sheet 3

Inventor
Willard O. Twombly
by Townsend B. Behrman
Attorney

Patented Sept. 5, 1933

1,925,352

UNITED STATES PATENT OFFICE 1,925,352

TEMPERATURE CONTROL SYSTEM FOR AUTOMOTIVE ENGINES

Willard O. Twombly, Jackson, Mich., assignor to C T Electric Company, Jackson, Mich., a corporation of Michigan Application June 24, 1932. Serial No. 619,070

31 Claims. (Cl. 123—174)

This invention relates to improvements in temperature control system for automotive engines and constitutes a continuation in part of my application, Serial No. 611,860, filed May 17, 1932.

As discussed at length in my prior application referred to above, the efficiency of an internal combustion engine is dependent upon the temperature of operation. Thus it becomes the primary object of the present invention to provide novel means for regulating the ventilation openings in an incased automotive engine to enable the same to be operated at substantially its maximum efficiency under all conditions.

More specifically stated, one of the objects of the invention is to provide a temperature control system for automotive engines in which hydraulic pressure, preferably oil pressure, is employed to open and close ventilation openings. In the present day automotive engine, the oil pressure is maintained in the neighborhood of 30 to 40 pounds per square inch. Thus smaller motors may be employed to ventilate the encasement of the engine than is possible when employing the suction of the engine as disclosed in my above designated application. Furthermore, the oil pressure increases substantially proportionally to the increasing power required to open the ventilating means as the speed of the vehicle increases.

Another object of this invention is to provide automatic thermostatically controlled means for opening and closing shutters and louvers of a motor vehicle having an overriding hand operating means for locking the same in an opened position.

A further object of this invention is to provide louver operating means which are directly located upon the side hood and are thermostatically controlled by means preferably located in direct contact with the engine block.

A still further object of this invention is to provide novel thermostatically controlled valve mechanism for controlling the motor operating louvers and shutters.

Other objects and advantages of my invention will appear as the description of the invention proceeds. It is to be clearly understood, however, that I do not intend to limit myself to the exact details shown or described but that I intend to include as part of my invention, all such changes and modifications of parts as would occur to those skilled in this art and would fall within the scope of the claims.

In the drawings wherein several possible embodiments of my invention are set forth, Fig. 1 is a broken side elevation of one embodiment of my invention in which a single liquid operated motor is employed to open and close the ventilation openings in a motor vehicle.

Fig. 2 is a cross sectional view of Fig. 1 taken on the lines 2—2 with the louver operating means omitted for clarity.

Fig. 3 is a plan view, taken on line 3—3 of Fig. 2, of the operating motor showing the overriding hand operated means.

Fig. 4 is a side elevation, taken on line 4—4 of Fig. 2, of the overrunning hand operated means for locking the louver and shutter openings.

Figure 5:
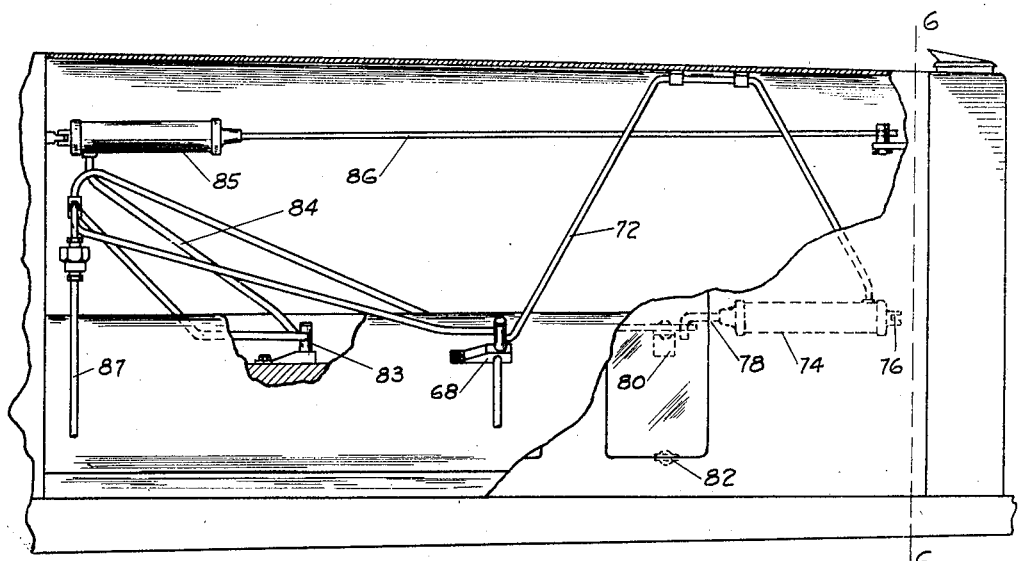
Fig. 5 is a modified embodiment of my invention in which individual motors and thermostats are employed to operate the louvers and shutters.

With reference to the accompanying drawings, reference character 1 designates generally an encasement for the automotive engine 2. The encasement 1 is provided with ventilation openings in the hood 3 and radiator 4, having shutters 5 and louvers 6 regulating the same, preferably, in the manner described in my above identified application. An arm 7 is pivotedly connected at 8 to brackets 9 secured to the louvers 6 and the arm 7 is provided with a forked end 10. A rock shaft 11 journaled in bearing in the form of brackets 12 is secured to the dash 13. Crank arms 14 are supported from the rock shaft and may have their respective angularity adjusted thereupon through the employment of set screws. The crank arms 14 preferably have rollers 15 affixed thereto over which the fork 10 may be positioned to positively yet removably couple the arms 7 to the arms 14. Through the employment of the foregoing construction the side of the hood 3 may be raised and lowered without affecting the adjustment of the louver operating mechanism.

A lever arm 16 is secured to the shaft 11 and adapted to rock the same through a link 17 pivotedly secured to a coupling member 18 by means of a dog-point set screw 19 coacting in a grooved portion 20 of the link 17. The coupling member 18 is adjustably affixed to the extended piston rod 21 by a set screw 22.

As shown in detail in Fig. 3, an elongated cylinder 23 is pivoted at 24 to a bracket 25 secured to the dash 13 in any well known manner. A solid piston 26 is provided with a plurality of closely spaced grooves 27 into which foreign matter carried by the operating fluid may lodge without scoring the cylinder wall.

Similarly disposed cup leathers 28 are provided at opposite ends of the piston 26 and are retained by washers in the usual manner. A coil spring 29 is located in the cylinder 23 opposite the fluid pressure end of the piston 26. This spring is of sufficient strength to overcome the operating friction of the louvers and shutters to close the same. Obviously the spring 29 may be omitted from the cylinder and connected directly to any part of the linkage which is moved in one direction to open the louvers and shutters. The piston rod 21 extends forward and is connected to a bell crank lever 30, operatively connected to a shutter mechanism in the manner described in detail in my co-pending application referred to above. It will be apparent that the link 17 could be extended to the lever 30 and the piston 26 coupled thereto in lieu of the manner described.

Forming an important feature of this invention is a manually controlled rod 31 which may be coupled to the rock shaft 11 by being affixed to an extended end 32 of the link 17. The rod 31 protrudes through the dash 13 and panel 33 and is adapted to be operated from the front seat of the motor vehicle. A loose bushing 34 is provided in the panel 33 with a restricted doglike portion 35 adapted to catch in notches 36 milled in the rod 31 adjacent the nob 37.

The construction of my improved fluid operating system is as follows: A conduit 38 is tapped into the pressure side of the usual pressure oiling system of an automotive engine, for example, into the oil conduit leading to oil gage upon the panel. Although the oiling system is preferably employed as a source of fluid pressure, obviously, any other source of pressure, for example, water pressure in the circulating system could be used as an operating fluid. The conduit 38 is coupled to the slotted intake port 39 of the thermostatically controlled valve generally designated 40 in any well known manner. A conduit 41 is likewise coupled to the outlet port 42 and extends to a port 43 in the cylinder 23. The thermostatic mechanism for controlling my temperature control system is preferably located directly upon the engine block. It will be readily apparent, however, that the thermostatic mechanism may be successfully operated to varying degrees in contact with any medium through which the heat of the cylinder walls of the engine is dissipated.

A specific description of the valve 40 is as follows: The valve housing is provided with upper and lower chambers 44 and 45, respectively. The chamber 44 is reamed throughout its greater portion to provide a close fit for a slidable piston 46 having grooved ports 47 and 48 intermediate its ends. The piston 46 may be drilled or of tubing to provide a by-passage 49 therethrough to prevent any leakage of fluid into the chamber above the piston for unbalancing the same. A spring 50 is inserted above the piston 46 and abuts an adjustable stopping plug threadedly secured in the upper threaded portion of the chamber 44. A capping plug 52 may also be threadedly secured in the chamber 44 to further seal the same and protect the plug 51 from unskillful tampering. A channel 53 is drilled through the housing and intersects the channels constituting the intake and outlet ports 39 and 42. The channel 53 opened into the port 42 to direct the flow of fluid into the conduit 41. A by-passage 55 is provided communicating with the outlet port 42 and discharging into the chamber 45.

Various thermo-sensitive means may be located in the chamber 45 to raise and lower the piston 46. Preferably, a composite strip 56 of thermostatic metal is anchored at one end and supports the lower end of the piston. To prevent the operating fluid from being discharged directly upon the strip 56 from the by-passage 55, a baffle member 57 is provided to direct the same toward a drain port 58 into a conduit 59 which will discharge into the crank case when oil is being employed as an operating medium, and thus eliminates any waste thereof. When the valve is to be secured directly to the engine block, the housing is drilled at 60 to permit the passage of a stud bolt which may be of the type employed to secure the head to the block or if desired, an insert 61, preferably of material of relatively high thermal conductivity, such as copper or aluminum, may be threadedly secured in the cylinder head 62 with the end thereof extending into the firing chamber. The insert 61 is provided with an octagonal supporting flange 63 adapted to support the thermostatic valve 40 slightly above the head 62 and having a reduced threaded post 64 adapted to pass through the aperture 60 to receive a nut 65. By supporting the valve 40 in this manner, the strip 56 is subjected to temperatures which correspond substantially with those of the cylinder walls thus effecting a sensitive and responsive control of the shutters and louvers.

The operation of the foregoing described mechanism is as follows: With the engine in a cool condition, the shutters 5 and louvers 6 are closed and the crank arm 14 will assume the position shown in Fig. 1. Also the piston 46 in the valve 40 will be in the position shown in Fig. 9 with the intake port 39 closed. As the engine 2 becomes heated from operation, the strip 56 will be deflected upwardly gradually carrying the valve 46 therewith until the grooved port 47 is in the horizontal plane of the port 39 and communication between the intake port 39 and the outlet port 42 through the channel 53 is no longer interrupted. With the piston 46 in the position shown in Fig. 10, the oil under pressure will pass through the conduit section 38 and 41 into the cylinder 23 moving the piston 26 forwardly to force the rod 21 to the right as viewed in Fig. 1 to open the shutters. At the same time the shaft 11 is rocked clockwise to open the louvers. The amount the shutters and louvers will be opened depends upon the width the port 39 is opened and the continuous increase in engine temperature. Under decreasing engine temperature, the spring 50 will overcome the force stressing the strip upwardly and the piston will be moved downwardly closing the intake port 39 and reopening communication between the outlet port 42 and the by-passage 55 through the grooved port 48 to permit the spring 29 in the cylinder to force the oil therein into the chamber 45 from which it drains into the crank case through the conduit 59. As stated before the spring 29 is of sufficient strength to close the shutters 5 and louvers 6.

When the rock shaft 11 is rotated in either direction such movement is imparted to the rod 31 and the operator of the vehicle is visually instructed of the cycle of operation of the system. In the event the automatic operation of the system fails for any reason, the operator is thus notified and the shutters and louvers may be locked open by forcing the rod 31 inwardly and upwardly to position the dog 35 in the notches 36. The employment of the overriding rod 31 is also of decided importance when the engine is stopped in an over heated condition. As it is not practical to machine the piston 46 and the sleeve in which it reciprocates with such precision as to eliminate all oil leakage thus permitting the piston 46 to continue upwardly upon over heating to close all ports and seal the operating fluid in the motor to retain the shutters and louvers open after the source of operating power is removed, as was done in my co-pending application heretofore designated, the rod 31 is adapted to override the entire system and the shutters and louvers may be permanently locked open when the engine is stopped under such conditions.

In the event automatic operation of the shutters and louvers is not desired, it will be readily apparent that my improved shutters and louvers operating structure possess decided advantages when controlled solely by manual operation.

Figure 6:
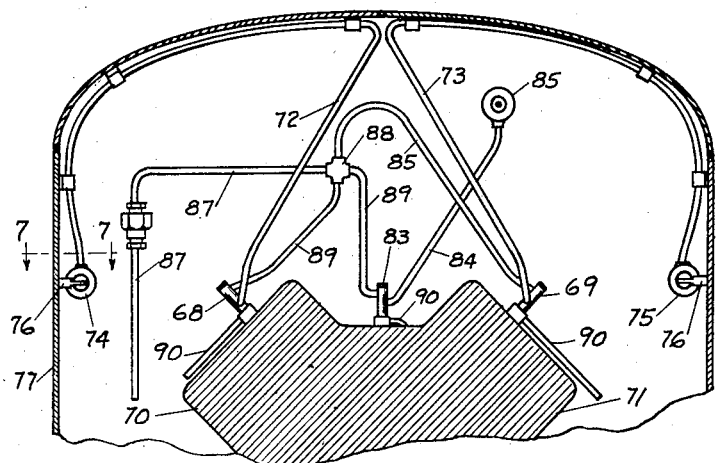
Fig. 6 is a cross sectional view taken on line 6—6 of Fig. 5.
Figure 7:
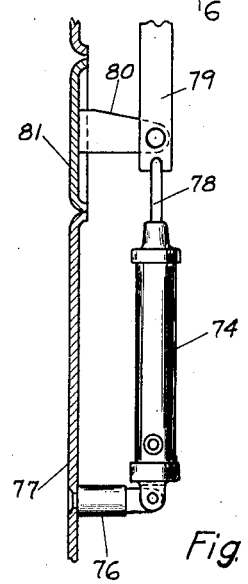
Fig. 7 is a cross sectional view taken on line 7—7 of Fig. 6 showing the motor mounted upon the side of the hood.

In Figs. 5 and 6, a modified embodiment of my invention is shown specially adapted to a multi-cylinder block type of engine. In this type of engine it is customary to have two or more substantially independent power units having separate carburetion and cooling systems. It will be readily apparent that under such circumstances as a cross wind and the like that the uniform openings of louvers on both sides of the engine may cool one cylinder block more than the other. In order to overcome this condition, separate thermostatic valves 68 and 69, which may be identical with the valve 40 or 94, are mounted directly on the cylinder blocks 70 and 71. Flexible outlet conduits 72 and 73 extend to separate motors 74 and 75, respectively, and are pivotedly supported upon post 77 secured to the sides of the hood 76. The motors 74 and 75 are preferable identical with the motor 23 and have piston rods 78 directly secured to an axially reciprocable member 79 to which the brackets 80 located upon the louvers 81 are secured. Upon an outward movement of the rod 78, the louvers 81 will swing upon the pivot 82 to open position.

For the regulation of the front shutter a thermostatic valve 83, having an outlet conduit 84 extending to a motor 85, is preferably located upon a portion of the engine having substantially a mean temperature with respect to the cylinder blocks 70 and 71. The motor 85 may also be identical with the motor 23 and has a rod 86, corresponding to the rod 21, manipulating the front shutters. The operating fluid for the various motors is conducted from the pressure side of the system through a common conduit to a three branch fitting 88 from which intake conduits 89 extend to the various valves. Draining conduits from the valves are designated by reference character 90 which may branch into a common conduit (not shown) leading into the crank case or the like.

Figure 8:
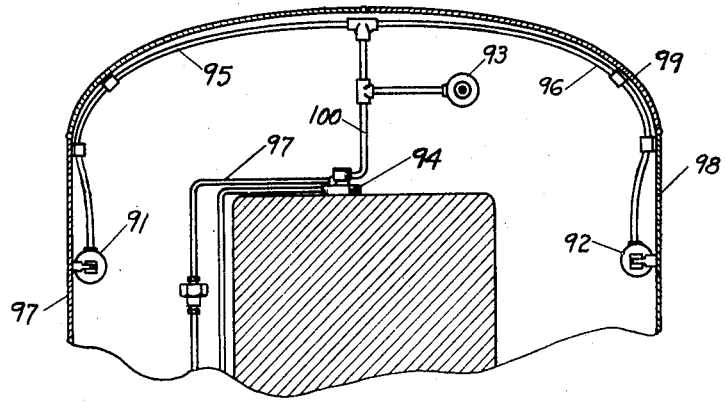
Fig. 8 is another modified embodiment of my invention in which individual motors are under the control of a single thermostat.

In Fig. 8 is shown a slightly modified arrangement of control over that shown in Figs. 5 and 6 wherein separate motors 91, 92, and 93 are employed to regulate the louvers and shutters, respectively, are under the control of a single thermostatic valve 94, preferably of the construction shown in Fig. 12 to be hereinafter described. Flexible conduits 95 and 96 connect the motors 91 and 92 to the valve 94. It will thus be readily apparent that the hinged side 97 and 98 of the hood 99 may be raised and lowered without interruption of the coaction between the motor and the louvers with the entire louver operating mechanism being virtually supported upon the hood in a compact unit.

Figures 9, 10, 11:
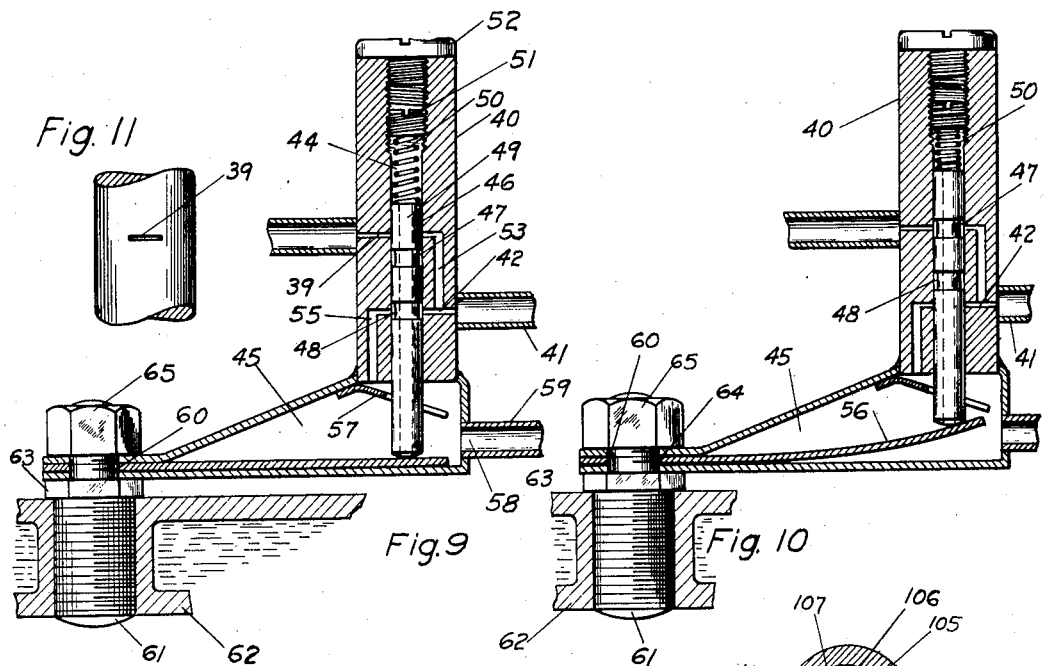
Figs. 9 and 10 are cross sectional views of one type of thermostatically controlled valve showing the valve in cool and hot positions, respectively.
Fig. 11 is a detail of one of the ports in the valve shown in Fig. 9.
Figures 12, 13:
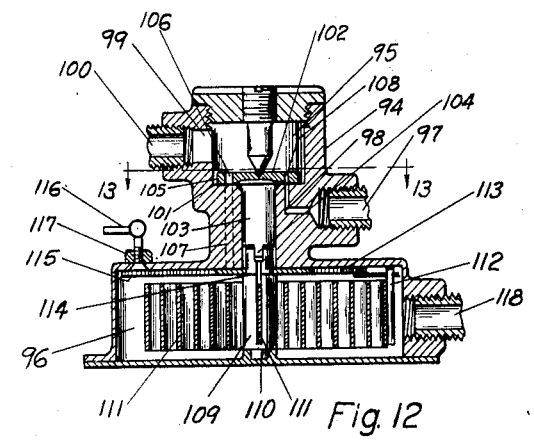
Fig. 12 is a cross sectional view of a modified type of valve mechanism.
Fig. 13 is a cross sectional view taken on line 13—13 of Fig. 12.

A modified type of valve is shown in Fig. 12 which permits a full range automatic control of the louvers and shutters yet does not lend itself to the economy of manufacture residing in the valve shown in Figs. 9 and 10. As illustrated, 94 generally designates a thermostatic valve member having a housing defining upper and lower chambers 95 and 96, respectively. A conduit 97 tapping the pressure side of the fluid operating system is threadedly secured in the housing communicating with an intake port 98 which is very small in comparison with the outlet port 99 discharging into the conduit 100 extending to the motors.

The chamber 95 is provided with an annular shoulder 101 defined by a reamed hole into which an oscillatory valve member 102 having a stem 103 and male member 104 is guided. The member 102 has a flanged head portion 105 provided with a plurality of drain ports 106 adapted to communicate with a corresponding number of by-passages 107 extending from chamber 95 into chamber 96 upon oscillation in one direction. As shown in Fig. 13, an intake port 108 is shown in alignment with the port 98, the valve member thus being in open position.

A slotted shaft 109 having a female portion cooperating with the male 104, has a portion 110 journaled for oscillation in a boss centrally located in the chamber 96. A thermo-sensitive coil 111', well known in itself, has one end thereof secured in a slot 111 in the shaft 109 and the other secured through a bracket 112, to an external gear member 113 supported for rotation upon a shoulder 114 of the shaft 109. A pinion 115 meshes with the gear 113 and has a manually operated member 116 for rotating the same. A lock nut 117 is preferably employed to lock the pinion 115 in a fixed position. It will be apparent from the foregoing description that by rotating the pinion 115 and gear 113 that the coil 111' will be rotated to adjust the ports 106 and 108 in the valve member 103 relative to the port 98 and by-passages 107 and in the chamber 95.

The operation of the thermostatic valve 94 is as follows: With ports 98 and 108 in alignment, the operating fluid will gradually flow into the chamber 95 and out the port 99 to the motors to open the louvers and shutters. The pressure in the chamber 95 will tend to force the valve member 102 into a sealed fit with the annular shoulder 101. As the temperature of the coil 111' is decreased, a clockwise torque will be applied to the shaft 109 and the ports 106 will move in alignment with the by-passage 107 and the fluid in the motors will be exhausted therethrough into the chamber 96 from which it is drained by a conduit 118 into the crank case when oil is being employed as an operating fluid.

In the event the temperature of the engine continues to increase after the ports 98 and 108 are in alignment and the louvers and shutters are in full open position, the coil 111' will continue to rotate the valve 102 counter clockwise until all ports and by-passages are in a closed position. If the engine is stopped in this overheated condition the fluid in the motors will retain the shutters and louvers open until the cooling of the engine permits the coils 111' to rotate the valve 102 to open the drain ports 107. The port 108 is very small in comparison with the ports 107 in order that the louvers and shutters may be opened slowly and smoothly and closed rapidly.

Figure 14:
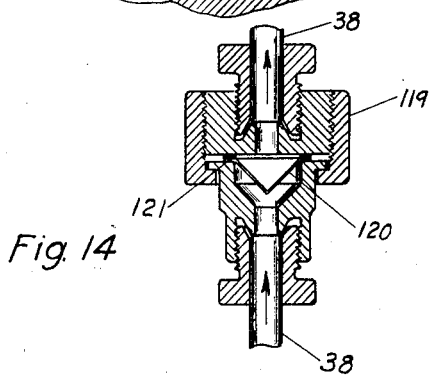
Fig. 14 is a detailed cross sectional view of an improved type of filter inserted in the feed line between the pump and the valve mechanism.

In Fig. 14, is shown one type of filter which may be inserted between the source of fluid pressure and the thermostatic valve. A union 119 of the usual type is inserted in the conduit 38 of Fig. 1, and has a funnel-shaped filter 120 of fine mesh screening having a flanged upper edge 121 clamped in said union. With this type of filter located between the thermostatic valve and source of pressure, when the engine is stopped, the fluid in the conduit 38 will drain back under force of gravity and foreign matter will be flushed off the filter.

From the foregoing description, it will become apparent to those skilled in the art that I have provided a practical automatic control for ventilation openings which in its preferred form can be directly installed upon the present day motor vehicle without modification of or interference with the pressure oiling system.

Having described my invention, what I claim as new and desire to protect by Letters Patent is:

1. In a temperature control system, the combination with an engine, of an encasement for said engine having ventilation openings therethrough, a pressure oiling system on said engine, means regulating said openings including a fluid motor, and conduit connections between said motor and said system.

2. In a temperature control system, the combination with an engine, of an encasement for said engine having ventilation openings therethrough, a pressure oiling system on said engine, means regulating said openings including a fluid motor, conduit connections between said motor and said system, and a thermostatically controlled valve inserted in said connections.

3. In a temperature control system, the combination with an engine, of a hood for said engine having ventilation openings therethrough, a pressure oiling system on said engine, side louvers associated with certain of said openings for regulating the same, a fluid motor operatively connected with said louvers, and conduit connections between said motor and said system.

4. In a temperature control system, the combination with an engine, of a hood for said engine having ventilation openings therethrough, a pressure oiling system on said engine, side louvers associated with certain of said openings for regulating the same, a fluid motor operatively connected with said louvers, conduit connections between said motor and said system, and a thermostatically controlled valve inserted in said connections.

5. In a temperature control system, the combination with an engine, of an encasement for said engine including front radiator shutters and side louvers regulating ventilation openings therein, a pressure oiling system on said engine, a fluid motor operatively connected with said shutters and louvers, and conduit connections between said motor and said system.

6. In a temperature control system, the combination with an engine, of an encasement for said engine including front radiator shutters and side louvers regulating ventilation openings therein, a pressure oiling system on said engine, a fluid motor operatively connected with said shutters and louvers, conduit connections between said motor and said system, and a thermostatically controlled valve inserted in said connections.

7. In combination with an engine provided with a pressure oiling system and means controlling the flow of air to cool the engine, a pressure responsive extensible chamber regulating said means, a conduit directing oil under pressure from said system into said chamber, and thermostatic means located in said conduit regulating the flow of oil to and from said chamber.

8. In combination with an engine provided with a pressure oiling system and means controlling the flow of air to cool the engine, a pressure responsive extensible chamber regulating said means, a conduit operatively connected with said system opening into said chamber to effect ingress and egress of oil, and a thermostatic valve in said conduit regulating the flow of oil in said conduit.

9. In combination with an engine provided with a pressure oiling system and means controlling the flow of air to cool the engine, means for closing said first means, means operated by the pressure in said system for opening said first means, a thermostatic valve regulating the flow of oil from said system against said second means, the entire flow of oil against said second means being effective in operating the same.

10. In combination with an engine provided with a pressure oiling system and means controlling the flow of air to cool the engine, a pressure responsive extensible chamber regulating said means, a thermostatic valve regulating the flow of oil from said system into said chamber to open said first means, said valve in one position, with the engine cool, preventing the flow of oil from said system into said chamber, and means for closing said first means and removing the oil from said chamber with the valve in the said position.

11. In a temperature control system, the combination with an engine, of an encasement for said engine having ventilation openings therethrough, a pressure oiling system on said engine, means regulating said openings including a fluid motor, conduit connections between said motor and said system, and a thermostatically controlled valve mounted directly on said engine inserted in said connections.

12. In a temperature control system, the combination with an engine, of an encasement for said engine having ventilation openings therethrough, a source of operating power, means automatically regulating said openings including a motor, connections between said source and said motor, and an overriding manually operated control member connected to and adapted to lock said means in a predetermined position.

13. In a temperature control system, the combination with an engine, of an encasement for said engine having ventilation openings therethrough, means automatically regulating said openings including a motor, an overriding manually operated control member connected to and indicating the cycle of operation of said means, and means cooperating with said member to lock said first means in a predetermined position.

14. In a temperature control system, the combination with an engine, of a hood for said engine having louvers located therein, axially reciprocal shafts operatively secured to said louvers to open and close the same simultaneously, a rock shaft positively coupled to said shaft, a thermostatically controlled motor connected to said rock shaft, and an overriding manually operated member operatively connected to said rock shaft.

15. In a temperature control system, the combination with an engine of an encasement for said engine having front shutters and side louvers located therein, a rock shaft, axially reciprocal members connected to said louvers and shutters to open and close the same, means positively connecting said members to said rock shaft, a cylinder having a pressure operated piston mounted beneath said hood, connections between said piston and said shaft, thermostatically controlled means for admitting pressure to one side of said piston, and a spring located on the other side of said piston.

16. In a temperature control system, the combination with an engine, of a hood, louvers mounted in said hood, motors directly supported by said hood, means operatively connecting said louvers with said motors and thermostatically controlled mechanism operating said motors.

17. In a temperature control system, the combination with an engine, of a hood, louvers pivotedly mounted in said hood, a motor directly supported by said hood, means operatively connecting said louvers and said motor to move said louvers in one direction, means thermostatically controlled by the temperature of said engine controlling said motor, and flexible connections between said motor and said last means.

18. In a temperature control system, the combination with an engine, of a hood, side louvers mounted in said hood, cylinders directly secured to said hood having pistons operatively connected to said louvers, a fluid pressure system, conduit connections between said cylinder and said system, and a control valve inserted in said connections.

19. In a temperature control system, the combination with an engine, of an encasement for said engine having front shutters and side louvers, individual operating motors for said shutters and louvers, a source of operating power for said motors, connection between said motors and said source, and a single thermostatically controlled mechanism inserted in said connection regulating said motors.

20. In a temperature control system, the combination with a multi-cylinder block type engine, of a hood having side louvers, independently operated means operatively connected to said louvers adapted to open and close the same, and independently operated thermostats located upon the cylinder blocks controlling the louvers adjacent thereto.

21. In a temperature control system, the combination with an engine having angular disposed cylinder blocks, of a hood for said engine having louvers located therein on opposite sides of said engine, separate regulating motors operatively connected to said opposed louvers, and separate thermostatic controlled mechanisms located upon said blocks regulating the motor connected to the louvers adjacent thereto.

22. In a temperature control system, the combination with an engine having a pressure oiling system, an encasement for said engine having ventilation openings therethrough, means supported in said encasement for regulating said openings, a pressure operated motor operatively connected to said means, a conduit coupling said motor with said system, a thermostatically controlled valve inserted in said conduit and an oil filter in said conduit located between said system and said valve.

23. In a temperature control system, the combination with an engine having a pressure oiling system, an encasement for said engine having ventilation openings therethrough, means supported in said encasement for regulating said openings, a pressure operated motor operatively connected to said means, a thermostatically controlled valve, conduits extending from said valve to said system and motor, respectively, and a drain conduit extending from said valve into said system.

24. In a temperature control system, the combination with an engine, of an encasement for said engine having ventilation openings therethrough, means regulating said openings including a fluid motor, a fluid pressure system, a conduit connecting said motor with said system, a thermostatically controlled valve inserted in said conduit, said valve comprising an intake port, an outlet port discharging into the section of said conduit to said motor, and a port draining back into said system.

25. In a temperature control system, the combination of a fluid pressure motor, a fluid pressure system, conduit sections connecting said motor with the pressure side of said system, a valve inserted in said sections comprising a housing, a balanced piston having grooved ports intermediate the ends slidable in said housing, communicating ports in said housing interrupted by said piston opening into said sections, a by-passage communicating with one of said last ports interrupted by said piston, thermo-sensitive means coacting with said piston, a drain port for said housing communicating with said by-passage, said piston in one position opening said sections and in another position closing one of said sections and opening the other to said by-passage.

26. In a temperature control system, the combination of a fluid pressure motor, a fluid pressure system, conduit sections connecting said motor with the pressure side of said system, a thermostatically controlled valve inserted in said sections comprising a housing, a thermostatically controlled valve member supported in said housing, communicating ports in said housing interrupted by said member opening into said sections, a by-passage in said housing communicating with the conduit section extending to said motor, a drain port communicating with said by-passage, said member in one position opening said sections and in another closing one of said sections and opening the other to said by-passage.

27. A thermostatically controlled valve for fluid pressure systems comprising a housing, communicating intake and outlet ports in said housing, a by-passage in said housing communicating with one of said ports, a drain port communicating with said by-passage, a valve member supported in said housing adapted to interrupt the communication of said ports and by-passage, and thermo-sensitive means located within said housing coacting with said member.

28. A thermostatically controlled valve for fluid pressure system comprising a housing having upper and lower communicating chambers, communicating intake and outlet ports in said housing opening into said upper chamber, a valve member movably supported in said upper chamber adapted to interrupt the communication of said ports in one position, a by-passage from said upper chamber above said valve into said lower chamber whereby said valve is balanced, and thermo-sensitive means located within said lower chamber coacting with said member.

29. A thermostatically controlled valve for fluid pressure system comprising a housing having upper and lower chambers, intake and outlet ports in said upper chamber, a by-passage from said outlet into said lower chamber, a rotary valve seated upon an annular shoulder in said upper chamber having ports cooperating with said intake port and said by-passage to open and close the same alternatively, a drain port in said lower chamber, and thermo-sensitive means positioned in said lower chamber coacting with said member to reciprocate the same.

30. The combination with an engine, of an encasement for said engine including a hood having side louvers, a dash, a rock shaft terminating at opposite ends in crank members supported on said dash axially reciprocable member operatively secured to said louvers to open and close the same, said member terminating at one end in downwardly projecting fork members adapted to be detachably secured upon said crank member, and a manually controlled rod adapted to rock said shaft extending through said dash.

31. In a temperature control system, an engine, having walls defining a firing chamber, an encasement for said engine having ventilation openings therethrough, a motor for regulating said openings, an insert of relatively high thermal conductivity secured in said walls having a supporting surface slightly spaced above said engine, and thermostatically controlled mechanism for said motor located upon said supporting surface.

WILLARD O. TWOMBLY.

DISCLAIMER 1,925,352.—*Willard O. Twombly*, Jackson, Mich. Temperature Control System for Automotive Engines. Patent dated September 5, 1933. Disclaimer filed January 22, 1936, by the assignee, *Jeffrey N. Collins*.

Hereby enters this disclaimer to claim 1 of said Letters Patent.

[*Official Gazette March 10, 1936*]